US012632055B2

(12) United States Patent
Wollnack et al.

(10) Patent No.: US 12,632,055 B2
(45) Date of Patent: May 19, 2026

(54) LOGISTICS SYSTEM, METHOD FOR OPERATING A LOGISTICS SYSTEM AND FOR TRANSPORTING AN INDUSTRIAL TRUCK IN A LOGISTICS SYSTEM, UPGRADE KIT, AND COMPUTER PROGRAM PRODUCT

(71) Applicant: Jungheinrich AG, Hamburg (DE)

(72) Inventors: Simon Wollnack, Hamburg (DE);
Maximilian Richter, Hamburg (DE);
Ralf Wetegrove, Norderstedt (DE)

(73) Assignee: Jungheinrich AG, Hamburg (DE)

( * ) Notice: Subject to any disclaimer, the term of this patent is extended or adjusted under 35 U.S.C. 154(b) by 499 days.

(21) Appl. No.: 18/077,312

(22) Filed: Dec. 8, 2022

(65) Prior Publication Data

US 2023/0185314 A1     Jun. 15, 2023

(30) Foreign Application Priority Data

Dec. 9, 2021     (DE) ..................... 10 2021 132 533.1

(51) Int. Cl.
*G05D 1/00*         (2024.01)
*G06Q 10/08*        (2024.01)

(52) U.S. Cl.
CPC ......... *G05D 1/0295* (2013.01); *G05D 1/0022* (2013.01); *G05D 1/0293* (2013.01);
(Continued)

(58) Field of Classification Search
CPC ..... G08G 1/22; G05D 1/0293; B60W 30/165; H04W 4/46; G07C 5/008; H04L 67/12;
(Continued)

(56) References Cited

U.S. PATENT DOCUMENTS 11,579,631 B1 * 2/2023 Ebrahimi Afrouzi ........................ B60W 10/04
2010/0256835 A1 * 10/2010 Mudalige ................. G08G 1/22
701/2
(Continued)

FOREIGN PATENT DOCUMENTS

CN       109164809 A  * 1/2019 ........... G05D 1/0293
CN       110691368 A  * 1/2020 ........... H04B 17/318
(Continued)

*Primary Examiner* — Rachid Bendidi
*Assistant Examiner* — Irene C Khuu
(74) *Attorney, Agent, or Firm* — Scully, Scott, Murphy & Presser, P.C.

(57) ABSTRACT

A logistics system including: a leading truck and a following truck. The leading truck is configured for autonomous driving and the following truck is not. The leading truck includes sensors for spanning an environment monitoring region. The leading and following trucks each include a transceiver for operating a wireless data connection between the leading and the following trucks. The leading and following trucks are configured such that the leading truck controls the following truck remotely via the wireless data connection. The leading industrial truck includes an autonomous controller configured to control the following truck along a target path to determine a position and an orientation of the following truck in relation to the leading truck. The autonomous controller is configured to remotely control the following truck to always be located within the environment monitoring region of the leading truck when traveling along the target path.

13 Claims, 4 Drawing Sheets

(52) U.S. Cl.
CPC ......... *G05D 1/0231* (2013.01); *G05D 1/0255* (2013.01); *G05D 1/0257* (2013.01)

(58) Field of Classification Search
CPC ....... B66F 9/063; G01S 13/931; G06Q 40/08; B60T 7/22; B62D 59/04; G06V 20/58; G01C 21/34; G06F 3/04883; B60K 35/00; B60L 2240/622; B60Q 1/507; B60R 16/0231; G05B 9/02; G06T 17/05; B65G 1/1373; B60D 1/36
See application file for complete search history.

(56) References Cited

U.S. PATENT DOCUMENTS

| | | | | |
|---|---|---|---|---|
| 2015/0127189 A1* | 5/2015 | Mehr | .................. | G05D 1/0295 701/1 |
| 2016/0054735 A1* | 2/2016 | Switkes | .............. | G05D 1/0217 701/23 |
| 2016/0274591 A1* | 9/2016 | Bick | .................... | G05D 1/0027 |
| 2018/0181143 A1* | 6/2018 | Hiramatsu | .......... | G05D 1/0291 |
| 2018/0240344 A1* | 8/2018 | Matthiesen | ........... | B60Q 1/268 |
| 2020/0241563 A1* | 7/2020 | Van Der Knaap | .. | B60W 30/165 |
| 2020/0264634 A1* | 8/2020 | Hadi | ................ | B60W 60/0023 |
| 2020/0332479 A1* | 10/2020 | O'Donnell | ............. | E01C 19/48 |
| 2020/0363803 A1* | 11/2020 | Nix | .................... | G01C 21/3484 |
| 2021/0237752 A1* | 8/2021 | Ewert | ................. | G05D 1/0033 |
| 2023/0185314 A1* | 6/2023 | Wollnack | ............. | G05D 1/0295 701/2 |

FOREIGN PATENT DOCUMENTS

| | | | |
|---|---|---|---|
| DE | 10 2010 013 647 A1 | 2/2011 | |
| DE | 10 2015 205 032 A1 | 9/2016 | |
| DE | 10 2018 212 025 A1 | 1/2020 | |
| DE | 102020200890 A1 * | 7/2021 | ............ G01S 13/06 |
| DE | 10 2020 102 329 A1 | 8/2021 | |
| EP | 3 511 287 A1 | 7/2019 | |

* cited by examiner

LOGISTICS SYSTEM, METHOD FOR OPERATING A LOGISTICS SYSTEM AND FOR TRANSPORTING AN INDUSTRIAL TRUCK IN A LOGISTICS SYSTEM, UPGRADE KIT, AND COMPUTER PROGRAM PRODUCT

CROSS-REFERENCE TO RELATED APPLICATION

The present application is based upon and claims the benefit of priority from DE 10 2021 132 533.1 filed on Dec. 9, 2021, the entire contents of which is incorporated herein by reference.

BACKGROUND

Field

The present disclosure relates to a logistics system and to a method for operating a logistics system. The present disclosure also relates to a method for transporting an industrial truck in a logistics system and to an upgrade kit for an industrial truck. The present disclosure further relates to a computer program product which causes the logistics system to perform a method for operating a logistics system.

Prior Art

Industrial trucks configured for autonomous driving operation are increasingly being used in logistics facilities. Vehicles of this kind are equipped with corresponding sensors for position determination and environment detection. They are capable of traveling along a predefined route in an automated or even autonomous manner and to evade obstacles. However, industrial trucks and warehouse vehicles that are exclusively manually guided are still used in logistics facilities alongside these autonomous vehicles. Therefore, in many cases, a mix of autonomously driving industrial trucks and manually controlled industrial trucks are in operation.

The work steps carried out at a logistics site vary in terms of their complexity. As a result, individual, less complex steps are carried out in a fully automatic manner and are thus predestined for autonomous vehicles. Other complex processes, such as order picking, i.e., removing goods of variable sizes from boxes and/or pallets, are still not accessible to automation. For this reason, these activities are still carried out by a person who preferably uses a manually guided industrial truck.

Mixed operation, i.e., a situation in which autonomously driving industrial trucks and manually controlled industrial trucks are operated together in a logistics facility, will constitute the normal case for the foreseeable future. For this reason, it is desirable to optimize said mixed operation.

SUMMARY

It is an object to provide a logistics system, a method for operating a logistics system, a method for transporting an industrial truck in a logistics system, an upgrade kit for an industrial truck, and a computer program product which causes a logistics system to perform such a method, wherein, in the logistics system, operation of industrial trucks that are equipped and configured for autonomous driving operation and industrial trucks that are not equipped and configured for autonomous driving operation is to be improved.

Such object can be solved by a logistics system, comprising a leading industrial truck and at least one following industrial truck, wherein the leading industrial truck is equipped and configured for autonomous driving operation and the at least one following industrial truck is not equipped and configured for autonomous driving operation, and wherein the leading industrial truck comprises an environment monitoring system, which spans an environment monitoring region, wherein the leading industrial truck and the at least one following industrial truck each comprise a communication unit and are configured to operate a wireless data connection between the leading industrial truck and the at least one following industrial truck, wherein the leading industrial truck and the at least one following industrial truck are further configured in that the leading industrial truck controls the at least one following industrial truck remotely via the wireless data connection, and wherein the leading industrial truck comprises an autonomous control unit, such as a controller, processor, CPU, computer, circuit etc., which is configured to control the following industrial truck along a target path and, in order to control the following industrial truck, to determine a position and orientation of the following industrial truck in relation to the leading industrial truck, wherein the autonomous control unit is further configured to remotely control the following industrial truck in that the following industrial truck is always located within the environment monitoring region of the leading industrial truck when traveling along the target path.

The industrial truck can be equipped and configured for autonomous driving operation with an automation level of 4 or higher. The following industrial truck can have an automation level of at most 3, i.e., it is equipped and configured to be operated with an automation level of 3 or less. Furthermore, the following industrial truck can be equipped and configured for autonomous driving operation with an automation level of 2 or lower, such as for autonomous driving operation with an automation level of 1 or lower. Furthermore, the following industrial truck can have no automation level, i.e., it is not at all equipped and configured for autonomous driving operation. With regard to the automation level, the generally accepted definition according to BASt, VDA and SAE standard J3016 is applicable. According to the further generally accepted definition, "autonomous driving" is used to refer to an automation level of 4 or higher. Accordingly, the following industrial truck, which is equipped and configured for operation with an automation level of 3 or, a lower level, is not to be regarded as being configured and equipped for autonomous driving operation within the context of the present description.

A trajectory of a target path can be defined both by the autonomous control unit of the leading industrial truck and by a central instance of the logistics system, for example a central computer of the logistics system.

For a journey along the target path, it is not only provided that both the leading industrial truck and the following industrial truck can move together, but also that the leading industrial truck does not move, i.e., remains still, while the following industrial truck follows the defined target path within the environment monitoring region of the leading industrial truck. Various driving modes can alternate during travel along the target path. It is also not necessary for all sections of the target path to be located within the environment monitoring region of the leading industrial truck at every point in time. For example, the intended target path may be much larger than the environment monitoring region of the leading industrial truck. However, the following industrial truck should always be within the environment monitoring region of the leading industrial truck when traveling along the target path.

The environment monitoring system of the leading industrial truck can comprise sensors for monitoring the environment. These sensors are, for example, laser scanners, cameras, radar scanners, Lidar scanners, or ultrasound sensors. The environment monitoring region defined by the environment monitoring system can be a warning field, a protection field, a personal protection region, or a machine protection region. The environment monitoring system of the leading industrial truck can be equipped and configured to operate the environment monitoring region as a personal protection region. However, the environment monitoring system is not used exclusively for personal protection, but can also prevent collisions of the autonomously driving leading industrial truck with objects such as machines or the like. Furthermore, the environment monitoring system of the leading industrial truck can be equipped and configured to guarantee personal protection with regard to the following industrial truck. In this connection, too, the environment monitoring region spanned by the environment monitoring system of the leading industrial truck does not necessarily exclusively act as a personal protection region, it can also be provided that collisions of the following industrial truck with objects are prevented by the environment monitoring system.

Furthermore, the following industrial truck can have its own environment monitoring system, and span its own, additional environment monitoring region for additional personal protection, for example. The environment monitoring system of the following industrial truck can be incorporated into the environment monitoring system of the leading industrial truck. In this connection, the data of the environment monitoring system of the following industrial truck can be transmitted to the environment monitoring system of the leading industrial truck. For this purpose, the wireless data connection between the two industrial trucks can be used, for example. In this way, the environment monitoring region of the leading industrial truck can be expanded by the sensors of the following industrial truck.

For example, an object at a particular position can be detected by the environment monitoring system of the following industrial truck. This information can be forwarded to the environment monitoring system of the leading industrial truck, in response to which the environment monitoring system of the leading industrial truck can expand its environment monitoring region in the direction of said object, for example. The environment monitoring system of the following industrial truck can independently detect breaches of the environment monitoring region and can then communicate such a breach of the protection field to the environment monitoring system of the leading industrial truck, for example. Based on this data, the environment monitoring system of the leading industrial truck can take measures, for example it may alter or adapt the target path for the following industrial truck or alter or adapt its own journey. It is also provided that the following industrial truck can independently react to a breach of the protection field, and the breach of the protection field can be merely communicated to the leading industrial truck. In the event of a breach of the protection field, the relevant industrial truck of which the protection field was breached can stop and additionally can transmit the safety-related information, for example, to all other vehicles that are traveling together in a common convoy, for example, but at least to the leading industrial truck.

At all points in time during its journey, the following industrial truck can always be located along the target path within the environment monitoring region of the leading industrial truck. As a result, the environment monitoring system of the leading industrial truck can not only guarantee the personal and collision protection of the leading industrial truck itself, but also the personal and collision protection of the following industrial truck.

In order for the leading industrial truck to be able to control the following industrial truck along the target path, the leading industrial truck can determine the position and orientation of the following industrial truck in relation to the leading industrial truck. This may take place, for example, by evaluation of sensor data of the environment monitoring system of the leading industrial truck. It is therefore not necessary for the following industrial truck itself to comprise a locating system.

According to other embodiments, it is provided that the autonomous control unit of the leading industrial truck can be configured to determine the position and/or orientation of the following industrial truck by evaluating internal parameters from a vehicle controller of the following industrial truck. This may be provided when both the leading industrial truck and the following industrial truck are equipped with a locating system. A locating system of this kind operates, for example, on the basis of a position system installed locally in a logistics facility. The locating system ascertains, for example by triangulation, the position of the relevant industrial truck in relation to radio base stations (beacons) present in the logistics facility. For example, the distance from an access point can be measured or at least estimated based on the signal strength. If the position of said access point in the logistics facility is known and, moreover, multiple radio data connections are evaluated, the position of the industrial truck in the logistics facility can be determined by triangulation. The evaluated radio data connections can be operated, for example, on the basis of RFID, ultra-wideband, Bluetooth, and/or WLAN. It is further provided, for example, that the position system of the relevant industrial truck can operate on the basis of a GPS system.

The logistics system according to an embodiment of this kind therefore can comprise a logistics facility, for example a logistics site, in which the leading industrial truck and the at least one following industrial truck are operated. The base stations used for the position determination can be present at known locations in a logistics site of this kind in order to make it possible to determine the position of the industrial trucks.

According to this embodiment, the industrial trucks can determine their position and, for example, also their orientation in absolute coordinates of the coordinate system defined by the logistics site. The position and/or orientation of the leading industrial truck and of the following industrial truck relative to one another can then be calculated from these absolute values.

An element for control of the following industrial truck by the leading industrial truck can be, namely, ultimately the determination of the relative location coordinates and the relative orientation of the two industrial trucks to one another. This is independent of whether the specific calculation takes place in absolute coordinates or in relative coordinates. In a logistics system according to one embodiment, according to which both the leading industrial truck and the following industrial truck are equipped with a locating system, the relative arrangement and, if applicable, also the orientation of the two industrial trucks relative to one another can be obtained by exchanging and evaluating the position data of the individual industrial trucks that come from the relevant locating system, i.e., based on absolute coordinates.

In this regard, the position data of the following industrial truck can be transmitted to the leading industrial truck. This can take place, for example, via the wireless data connection via which the leading industrial truck remotely controls the at least one following industrial truck. For example, the leading industrial truck knows its own position based on the data of its own locating system. The position of the following industrial truck is, for example, transmitted permanently to the leading industrial truck or the leading industrial truck queries the position of the following industrial truck. By comparing the two absolute positions of the two industrial trucks (in a common coordinate system), the leading industrial truck can determine the position of the two industrial trucks relative to one another. The orientation of the two industrial trucks relative to another, i.e., the orientation of the following industrial truck in relation to the leading industrial truck, can also be calculated, for example, from the data of the locating systems of the respective industrial trucks. For example, radio connections can be evaluated according to their direction, as a result of which the orientation of the relevant industrial truck relative to the base stations of a radio system of this kind and thus the absolute orientation of the industrial truck in the logistics facility can be determined.

Additionally or alternatively, data of the environment monitoring system, such as of the leading industrial truck, for example data from laser scanners, cameras, radar scanners, or the like, may be evaluated in order to determine the orientation of the industrial trucks relative to one another. It is also provided if the data obtained, for example, from the position detection system (absolute coordinates and absolute orientation) can be compared with the data obtained from the environment monitoring system (relative coordinates and relative orientation).

The communication units of both the leading industrial truck and the at least one following industrial truck can be equipped and configured for wireless communication. The wireless data connections established between the communication units can be radio data connections, for example. Said radio data connections can be operated, for example, according to one of the common and generally known radio data transmission standards, for example on the basis of WLAN, Bluetooth, ultra-wideband, or the like.

Alternatively or additionally, the wireless data connection between the communication unit of the leading industrial truck and the communication unit of the following industrial truck may take place on the basis of light signals. According to one embodiment, the lights present on the industrial trucks, for example driving lights, brake lights, turning indicator lights, warning lights, or the like, can be used to generate the light signals. The light signals on the basis of which the wireless data connection is operated according to this embodiment can be changed with such a high frequency, for example switched on and off, that the changes in the light signals used for the data transmission can be imperceptible to the human eye. As a result, the outward impression of the light signals of the industrial truck remain unchanged to an observer. The originally intended function of the light signals is not impaired. It is also provided that the light signals do not have to be transmitted in the visible frequency range. To this end, additional lights specially provided for this purpose may optionally be provided on the industrial trucks. According to this exemplary embodiment as well, the outward impression of the industrial truck remains unchanged to an observer, and the function of the light signaling system (brake lights, turning direction indicators, etc.) is not impaired. Corresponding detectors may be provided on the industrial trucks in order to detect these light signals, which can be emitted at a high frequency and/or not in the visible wavelength range either.

According to the present disclosure, an industrial truck not itself equipped for autonomous driving operation, namely the following industrial truck, can be conveyed along a target path in a fully automatic manner and thus so as to indirectly drive autonomously, namely by the leading industrial truck. It is therefore possible, by a relatively small number of vehicles equipped and configured for autonomous operation, namely the leading industrial trucks, to autonomously move a large number of industrial trucks not equipped and configured for autonomous operation, i.e., the following industrial trucks, in a logistics site. It is not necessary for every industrial truck to be equipped with the correspondingly expensive and complex hardware for autonomous driving operation, which constitutes a significant economic savings. The following industrial truck should offer the technical possibility of receiving commands via a wireless data connection and converting them into control commands for the vehicle controller. In other words, the following industrial truck can be remotely controlled via the wireless data connection.

The leading industrial truck can determine a position of the following industrial truck in order to control the following industrial truck. For this purpose, sensor data of the environment monitoring system and/or internal parameters from a vehicle controller of the following industrial truck can be evaluated. The case where the following industrial truck has its own position detection system and is thus able to determine its absolute position within a logistics facility has already been described above. Data of this kind can be queried from a vehicle controller of the following industrial truck in order to subsequently evaluate said data. However, this requires the following industrial truck to have suitable sensors, for example a locating system, as described above, and requires the position value to be transmitted from the following industrial truck to the leading industrial truck.

If the following industrial truck does not have its own locating system, it may nevertheless be useful for the leading industrial truck to query data from the vehicle controller of the following industrial truck in order to determine the position of the following industrial truck. According to an embodiment of this kind, the autonomous unit of the leading industrial truck can be configured to query and evaluate sensor data from its own environment monitoring system. Since the following industrial truck is located in the environment monitoring region of the leading industrial truck, it is visible to the environment monitoring system of the leading industrial truck, and therefore its position can be determined by said environment monitoring system. However, the autonomous unit can also be configured to query internal parameters from the vehicle controller of the following industrial truck. The data communication can take place via the wireless data connection between the leading industrial truck and the following industrial truck. The following industrial truck can continuously communicate the corresponding parameters to the leading industrial truck. It is therefore not necessary for the leading industrial truck to actively query said parameters from the following industrial truck, however this may also be provided.

Internal parameters which are communicated, for example, from the following industrial truck (which does not have its own position detection system) to the leading industrial truck can be, for example, measured values of an odometer, for example the distance covered from a particular point or at a particular time interval, a current speed, i.e., the value displayed on a speedometer, a steering angle, one or more wheel speeds, a motor speed, for example of the traction motor, and the like. Based on these internal parameters of the following industrial truck, the position of the following industrial truck can at least be estimated. Said internal parameters may be used in addition to the data obtained from the environment monitoring system of the leading industrial truck and relating to the position of the following industrial truck. If applicable, said data may also be used in addition to the data obtained from a locating system of the following industrial truck (if said industrial truck has its own position detection system). It is therefore possible, in various ways and with varying levels of redundancy, to calculate the position of the following industrial truck in relation to the leading industrial truck. The redundancies that may exist in the data can also be utilized, for example, to improve the position determination for the following industrial truck or to carry out a plausibility check.

In one way or another, a relative position of the following industrial truck in relation to the leading industrial truck can be determined. This relative position has proven to be a suitable parameter for calculating control commands to be sent to the following industrial truck, in that same follows the target path in the desired manner. The relative positioning of the two industrial trucks to one another can of course also be determined based on absolute position coordinates of the industrial trucks (in a common coordinate system). According to another embodiment, it is provided that the following industrial truck can transmit its absolute coordinates to the leading industrial truck. The autonomous unit of the leading industrial truck can be configured to calculate the relative coordinates of the industrial trucks to one another from said absolute coordinates and to control the paths (trajectories) of the industrial trucks relative to one another in an open-loop manner or in a feedback loop. An embodiment of this kind requires the following industrial truck to have corresponding sensors for position determination.

According to an embodiment, the logistics system can be developed in that the autonomous control unit can be further configured to control the leading industrial truck from a starting point to a destination point and, during this journey, can remotely control the at least one following industrial truck in that it travels within the environment monitoring region of the leading industrial truck in formation with the leading industrial truck.

Within the context of the present description, a journey "in formation" should be understood to mean that the leading industrial truck and the following industrial truck maintain a more or less constant spatial arrangement relative to one another during a common journey, i.e., when the two industrial trucks are moving. In other words, the leading industrial truck and the at least one following industrial truck can form a sort of convoy. In a convoy journey of this kind, the following industrial truck can travel, for example, more or less exactly in the trail of the leading industrial truck. In such a case, the journey in formation can correspond to travel with one following on behind the other. However, it may also be provided that, in the case of such a journey in formation, the leading industrial truck can travel so as to be laterally offset with respect to the following industrial truck or next thereto. The fixed spatial relationship of the industrial trucks relative to one another can be satisfied in all of these scenarios. However, this only applies to the case of straight-ahead travel or stationary cornering.

When steering into a curve, the fixed spatial relationship of the leading industrial truck and following industrial truck can, in many cases, be temporarily canceled for reasons relating to geometry. For example, the leading industrial truck can steer in, i.e., change its direction of travel, while the at least one following industrial truck is still traveling straight ahead. This can be relevant in the case of a convoy which consists of a single leading industrial truck and multiple following industrial trucks which follow on behind the leading industrial truck. However, in the context of the present description, an operating state of this kind should also be considered as a journey in formation. The arrangement of the leading industrial truck relative to the at least one following industrial truck can be, in principle, arbitrary in the journey in formation. However, the at least one following industrial truck should be located in the environment monitoring region of the leading industrial truck.

During formation travel, such as convoy travel in which the following industrial truck is located immediately behind the leading industrial truck, the position detection of the following industrial truck can, if applicable, be reduced or partially switched off. For example, it is conceivable in an operating situation of this kind for the following industrial truck to maintain a constant distance from the leading industrial truck driving ahead and to independently control its speed, in a similar manner to the function of cruise control in a road vehicle.

According to another embodiment, the autonomous control unit can be configured, for a journey from a starting point to a destination point, to calculate a lead path to be traveled by the leading industrial truck and a target path for the following industrial truck. The target path does not have to be calculated in the autonomous control unit of the leading industrial truck, but rather in a central instance of the logistics system, for example in a central computer. The path data can then be transmitted to the autonomous control unit of the leading industrial truck.

The target path can be calculated, for example, in consideration of a type of the following industrial truck. For example, the dimensions of the corresponding type of the following industrial truck can be taken into account, if applicable also its driving behavior and/or its maneuverability. The ascertaining of the type of the following industrial truck by the leading industrial truck can take place, for example, via the wireless data connection. For this purpose, a type identifier or serial number, for example, can be queried by the leading industrial truck or transmitted thereto from the following industrial truck. The data relating to the type of the following industrial truck can be transmitted, for example, at the moment at which the wireless data connection between the industrial trucks is established. Alternatively or additionally, this information may also be provided at the start of remote control of the following industrial truck by the leading industrial truck. The type of the following industrial truck can be taken in account by the autonomous unit of the leading industrial truck during calculation of the path for the following industrial truck.

According to another embodiment, the autonomous unit of the leading industrial truck can be configured to compare the calculated target path with an actual position or actual path of the following industrial truck. This can take place, for example, in a closed control loop. In other words, the following industrial truck can be controlled along the calculated path using said closed control loop.

Information obtained by the environment monitoring system may also be incorporated into the path calculation of the following industrial truck. If, for example, the environment monitoring system of the leading industrial truck detects an obstacle, said system can ensure that the leading industrial truck drives around said obstacle. However, the information relating to the obstacle may also be incorporated into the calculation of the target path of the following industrial truck, in that not only is a collision of the leading industrial truck with the obstacle prevented, so too is a collision of the following industrial truck with said obstacle.

The calculation of the lead path, i.e., the route taken by the leading industrial truck between a starting point and a destination point, may also take place in consideration of the local conditions at the logistics facility. For this purpose, corresponding infrastructure data of the logistics facility can be accessible to the autonomous control unit. Data of this kind may be stored locally in the leading industrial truck or accessible thereto via a data connection.

According to another embodiment, the logistics system can further comprise a request system, which in turn can comprise a request unit and a request coordination unit. The request unit can be configured to generate a dispatch request relating to a particular following industrial truck, wherein the dispatch request can comprise information relating to a pick-up zone or pick-up point and information relating to a delivery zone or delivery point, wherein the particular following industrial truck can be transported from the pick-up zone or pick-up point to the delivery zone or delivery point. The request coordination unit can be configured to receive the dispatch request from the request unit and to establish whether the leading industrial truck is available and, if it is available, to transmit to the autonomous control unit of the leading industrial truck a location within an approach environment of the pick-up zone or pick-up point as the starting point and a location within an approach environment of the delivery zone or delivery point as the destination point.

The request unit may be provided as a separate unit, for example as a separate operating unit or as a functional unit in an existing system of the following industrial truck. The dispatch request may be generated in response to an input generated, for example, manually by an employee at a user terminal. Alternatively, the dispatch request can be generated in response to a message or command that is generated by a higher-level software system of the logistics system. The request unit can comprise one or more corresponding interfaces for receiving the inputs that result in the dispatch request being generated. A manual input may, for example, take place by actuation of a corresponding quick-selection button on a touch display directly at the industrial truck, such as at the following industrial truck to be picked up. According to this embodiment, the request unit can be implemented, for example, as a functional unit in the vehicle controller of the industrial truck. According to another embodiment, the request unit can be implemented as an app on a mobile terminal, for example a tablet, smartphone, or the like. This mobile terminal can receive an input from a user and generate the dispatch request. For the purpose of the transmission of the dispatch request to the request coordination unit, the mobile terminal can be communicatively connected via a separate data connection to a higher-level central instance of the logistics system, for example a central computer, or to the vehicle controller of the industrial truck.

The dispatch request may be transmitted, for example, proceeding from the vehicle controller of the following industrial truck to the request coordination unit implemented in the central instance of the logistics system. Alternatively, the dispatch request may be transmitted proceeding from a mobile terminal directly to the central instance. It is also conceivable for a mobile terminal to be connected via a short-range data connection, for example a Bluetooth connection or the like, to the following industrial truck, and in this way the dispatch request is transmitted proceeding from the mobile terminal via the following industrial truck to the central instance of the logistics system.

The dispatch request can have the following form: Vehicle [vehicle ID] from point [A] to point [B], i.e., for example, [vehicle ID; A; B]. For example, a fixed vehicle identifier, an identifier assigned to the vehicle within the logistics system, or a serial number of the vehicle can be used as the vehicle ID. The points A and B can be defined, for example, based on their coordinates in a logistics site. It is also provided that the points A and B can be previously defined points as well as regions or zones to which particular functions are assigned, for example. For example, the point A may be a parking region for industrial trucks and point B may be a charging station or charging region. The dispatch request may be provided both on the basis of the position of the points A and B and based on the functions of the respective points or regions. The points may be selected on a digital map, for example by an employee by an app provided for this purpose. The corresponding points may also be provided to the request unit in an automated manner by a higher-level software system that is implemented, for example, in a central instance. It is also provided, for example, that an employee can hand the following industrial truck over to the higher-level software system after completing a particular activity. The industrial truck can determine its position by a locating system and report it to the central instance. The central instance can define the transmitted position as the pick-up point. The employee can also generate a dispatch request based on the functions of various regions. For example, a request that approximately reads as follows can be generated: [Vehicle ID; function region A; function region B]. A vehicle is sent, for example, from a parking region to a charging region based on a dispatch request of this kind. As soon as the leading industrial truck is available, the pick-up point as the starting point and also a delivery point as the destination point can be communicated to the request unit of this industrial truck. The delivery point may, for example, be defined by the employee. For example, said employee can define a position at which the goods loaded on the following industrial truck are transferred to another logistics unit, for example an HGV or the like.

The availability of the industrial trucks is known to a higher-level software system of the logistics system, which can be implemented in the central instance of the logistics system, for example. The availability of the industrial trucks can be shown to an employee in a corresponding app, for example on a tablet, smartphone, or the like. This simplifies the provision of corresponding manual dispatch requests.

The approach environment can comprise the relevant zone and/or the relevant point. This means that the approach environment of the pick-up zone may include or encompass the pick-up zone itself and/or the pick-up point itself. Equally, the approach environment of the delivery zone may include or encompass the delivery zone itself and/or the delivery point itself. The approach environment may also be an edge region adjacent to the actual zone in the periphery thereof, into which edge region the leading industrial truck approaches in order to pick-up the following industrial truck from the pick-up zone or to deliver the following industrial truck at a delivery zone of the corresponding zone. The same can apply when approaching a pick-up point and delivery point. The size of the approach environment can be selected in that the environment monitoring system of the leading industrial truck can be able to completely cover the relevant zone, i.e., the pick-up zone or delivery zone, with the environment monitoring region spanned by the environment monitoring system. The same applies to the delivery point and pick-up point. The infrastructure present in the pick-up zone or delivery zone, for example the charging stations or the like, does not have to be impaired by the operation of the leading industrial truck. The starting point and the destination point, between which the leading industrial truck moves in autonomous travel, may also lie within the pick-up zone or delivery zone.

According to another embodiment, the logistics system can be developed in that the leading industrial truck further comprises an identification system, which can be configured to identify a particular following industrial truck as the following industrial truck intended to be remotely controlled.

In a logistics environment, for example a logistics site, it is often the case that a large number of industrial trucks are potentially located within a spatially relatively limited region. This is the case, for example, in a charging region, in which the traction batteries of the industrial trucks are charged and, for example, a large number of industrial trucks are arranged one next to the other in charging stations. A high density of industrial trucks may also prevail in a loading and unloading region, in which goods of the logistics facility are transferred, for example, to HGVs or the like. In order to guarantee a reliable assignment between the leading industrial truck and the following industrial truck in an operating situation of this kind, the leading industrial truck can clearly identify the following industrial truck to which it is connected via the wireless data connection and which it remotely controls.

According to one embodiment, this identification can take place, for example, in that the leading industrial truck identifies a tag, for example a QR code or the like, on the following industrial truck using the environment monitoring system of the leading industrial truck, for example a camera comprised by the environment monitoring system with corresponding spatial and temporal resolution. For example, a vehicle number, which can also be transmitted to the leading industrial truck from the following industrial truck via the wireless data connection, can be read out from a tag of this kind. By a corresponding comparison of these data obtained in two ways in the leading industrial truck, said truck can clearly identify the following industrial truck. It is also provided that the leading industrial truck can be configured to read out wireless tags, for example a short-range RFID tag.

According to another embodiment, the identification system of the leading industrial truck can be configured to identify the following industrial truck on the basis of radio technology, for example a relatively short-range radio data transmission link. For this purpose, Bluetooth or ultra-wideband could be used, for example. Technology of this kind makes it possible, at the same time, to determine the relative position of the following industrial truck to the leading industrial truck.

If the following industrial truck has its own locating system, the leading industrial truck can also identify the following industrial truck based on the position thereof. For this purpose, for example, the position data read out from the locating system of the following industrial truck can be compared with position data determined by the leading industrial truck by its environment monitoring system. However, the absolute position, which is determined by the following industrial truck using its locating system, can be considered to be sufficiently accurate.

According to another embodiment, the identification system of the leading industrial truck can be configured, after the wireless data connection between the leading industrial truck and the particular following industrial truck has been established, to control the particular following industrial truck remotely to perform a target minimum movement. The relative location coordinates of the particular following industrial truck can be queried by the autonomous control unit of the leading industrial truck before and after the target minimum movement. An actual minimum movement of the particular following industrial truck can be calculated from a comparison of the location coordinates before and after the target minimum movement. If the deviation between the target minimum movement and the actual minimum movement is less than a predefined limit value, the particular following industrial truck which has just performed the minimum movement can be identified as the following industrial truck intended to be remotely controlled.

The leading industrial truck may also be configured to establish whether there are other leading industrial trucks in its environment that are also performing a coupling procedure with a following industrial truck. This may be done, for example, by querying a higher-level central instance, for example a central computer of the logistics system. In the case where multiple leading industrial trucks are performing coupling procedures at a close spatial distance from one another, the central instance can group these coupling procedures temporally close to one another. In other words, in a case such as this, a first leading industrial truck can define which one performs and completes the coupling procedure first. Subsequently, the central instance can signal to the second leading industrial truck that it can now start its coupling procedure. In this way, the coupling procedures are prevented from failing due to mix-ups. For the coupling, the leading industrial truck can actuate the following industrial truck in that same performs a target minimum movement. The movement can be detected during the defined time window, in that, subsequently, another industrial truck potentially located in the surroundings can start with its coupling procedure.

A predefined pattern that is characteristic of the leading industrial truck can be used as the target minimum movement. For example, said movement pattern can be statistical or characteristic of the relevant leading industrial truck, i.e., it can be defined in advance. In this way, the target minimum movement with which the leading industrial truck actuates the following industrial truck to be coupled can be distinguished from another target movement with which one of the other leading industrial trucks actuates another following industrial truck. In this way, too, mix-ups can be prevented. A particular type of minimum movement can be, for example, a journey of the following industrial truck by a particular distance that can be in the range of a few centimeters. For example, a first leading industrial truck may actuate the following industrial truck to be coupled in that same performs a target minimum movement that consists of 5 cm straight-ahead travel in the forward direction. In contrast, the second leading industrial truck can actuate the following industrial truck to be coupled in that same performs a target minimum movement that consists of 10 cm straight-ahead travel in the backward direction. These two leading industrial trucks can distinguish between their respective following industrial trucks to be coupled without any problems based on the respectively performed target minimum movement, and therefore the coupling procedures can even be performed at the same time in such a case.

According to the above-mentioned, described functions of the identification system, a clear assignment between the leading industrial truck and the following industrial truck can be ensured. No changes need to be made to the industrial trucks for this purpose.

According to another embodiment, the communication unit of the leading industrial truck and the communication unit of the following industrial truck can be configured to transmit control commands for remotely controlling the following industrial truck via the wireless data connection with a delay time that is less than an internal delay time of the internal control commands communicated in the following industrial truck on an internal data connection, such as on an internal data bus, and converted from the control commands. The delay time of the data transmitted on the wireless data connection can be less than or equal to 100 ms, such as less than or equal to 50 ms, less than or equal to 20 ms, less than or equal to 10 ms, or less than or equal to 5 ms.

In other words, the delay time of the wireless data connection between the leading industrial truck and the following industrial truck can be less than the delay time of the internal data communication within the following industrial truck. In this way, the leading industrial truck can communicate with the following industrial truck by real-time wireless communication. This ensures reliable and precise control of the following industrial truck by the leading industrial truck.

The specified upper limits for the delay times can ensure that the data arrives at the receiver after a known time and guarantees the determinism of the system. Thus, the communication becomes real-time wireless communication. For effective remote control of the following industrial truck, the delay time can be below the specified limits and for the delay time of the wireless communication can be less than the delay time of the internal data communication of the following industrial truck. Moreover, a data communication standard that has a high data transmission reliability and that is characterized by a low packet loss rate can be used for the wireless data connection.

According to an embodiment, the communication unit of the leading industrial truck and/or following industrial truck can be configured to transmit an emergency signal to a vehicle controller if the delay time of the data transmitted on the wireless data connection exceeds a predefined limit value or if the wireless data connection is interrupted. The vehicle controller can be configured to put the leading industrial truck and/or following industrial truck into a safe operating state in response to the emergency signal. For example, the vehicle controller can bring the leading industrial truck and/or following industrial truck to a stand-still in response to the emergency signal. This operating state can be interrupted if reliable data communication between the leading industrial truck and following industrial truck is re-established. In this way, it is ensured that the leading industrial truck does not lose the following industrial truck. Moreover, an interruption of the wireless data connection results in a safe state of the vehicle convoy and the journey of the convoy can be continued once wireless data communication has been re-established.

Such object can also be solved by a retrofit kit for an industrial truck that comprises a communication unit and a control unit. The communication unit is configured to operate a wireless data connection to a leading industrial truck and to receive control data for remotely controlling the industrial truck via the data connection. Moreover, the control unit comprises an interface to a vehicle controller of the industrial truck. The control data received from the communication unit via the wireless data connection are converted into driving commands for the industrial truck and said commands are provided at the interface. The communication unit and the control unit are configured accordingly. By virtue of the retrofit kit, the industrial truck that is equipped with a retrofit kit of this kind can be operated as a following industrial truck in a logistics system according to one or more of the above-mentioned embodiments.

With regard to the emergency stop properties of the leading industrial truck and following industrial truck, the interface used can allow for secure and reliable transmission of the emergency signals.

An industrial truck, including older industrial trucks, that is wholly unsuitable for autonomous driving operation due to a lack of corresponding equipment can be upgraded as a following industrial truck by virtue of the retrofit kit. However, such industrial trucks should have a corresponding interface at the vehicle controller. The interface can be, for example, a CAN bus interface or another common interface.

Incidentally, the same or similar advantages as have already been mentioned with regard to the logistics system itself described above also apply to an industrial truck as a following industrial truck upgraded with such a retrofit kit.

The following industrial truck should be provided with a wireless communication unit if it is not to be equipped with a retrofit kit. Furthermore, a control computer should be present, be it in the vehicle controller or implemented as a functional unit or provided by the control unit of the retrofit kit. The control computer can convert the driving commands transmitted for remote control of the following industrial truck into wheel speeds and steering angles, for example. The above-mentioned retrofit kit may be connected to the vehicle controller via an interface other than a CAN bus interface, for example industrial Ethernet (Ethercat, Profinet, Powerlink, etc.). Personal protection devices, for example the environment monitoring system, and the entire autonomy and navigation hardware can be found in the leading industrial truck.

Such object can also be solved by a method for operating a logistics system, wherein the logistics system comprises a leading industrial truck and at least one following industrial truck, the leading industrial truck is operated in autonomous driving operation and the at least one following industrial truck is operated in non-autonomous driving operation, the leading industrial truck comprises an environment monitoring system, which spans an environment monitoring region, wherein the leading industrial truck and the at least one following industrial truck each comprise a communication unit, which operate a wireless data connection, and the leading industrial truck further controls the at least one following industrial truck remotely via the wireless data connection, the leading industrial truck comprises an autonomous control unit, which controls the following industrial truck along a target path and, in order to control the following industrial truck, determines a position and orientation of the following industrial truck in relation to the leading industrial truck, wherein the autonomous control unit controls the following industrial truck remotely in that the following industrial truck is always located within the environment monitoring region of the leading industrial truck when traveling along the target path.

The same or similar advantages apply to the method for operating a logistics system that were already mentioned above with reference to the logistics system itself, and they will therefore not be repeated.

According to an embodiment of the method, the autonomous control unit of the leading industrial truck can determine the position and orientation of the following industrial truck in relation to the leading industrial truck by evaluating sensor data of the environment monitoring system and/or by evaluating internal parameters from a vehicle controller of the following industrial truck.

The leading industrial truck can control from a starting point to a destination point and, during this journey, can control the at least one following industrial truck in that it travels within the environment monitoring region of the leading industrial truck in formation with the leading industrial truck.

In the method, for the journey from the starting point to the destination point, the autonomous control unit can calculate a lead path to be traveled by the leading industrial truck and a target path to be traveled by the following industrial truck.

According to the method, a request system can comprise a request unit and a request coordination unit. The request unit can generate a dispatch request relating to a particular following industrial truck, wherein the dispatch request can comprise information relating to a pick-up zone or pick-up point and to a delivery zone or delivery point, and wherein the relevant following industrial truck is to be transported from the pick-up zone or pick-up point to the delivery zone or delivery point. The request coordination unit can receive the disco request from the request unit and can establish whether the leading industrial truck is available. If it is available, the request coordination unit can communicate to the autonomous control unit of the leading industrial truck a location within an approach environment of the pick-up zone or pick-up point as the starting point and a location within an approach environment of the delivery zone or delivery point as the destination point.

According to another embodiment, the leading industrial truck can further comprise an identification system and, using said identification system, the method can identify a particular following industrial truck as the following industrial truck intended to be remotely controlled.

According to the method, after the wireless data connection between the leading industrial truck and the particular following industrial truck has been established, the identification system can control the particular following industrial truck remotely in that it can perform a target minimum movement, and the relative location coordinates of the particular following industrial truck can be queried by the autonomous control unit before and after the target minimum movement and an actual minimum movement of the particular following industrial truck can be calculated from a comparison of the location coordinates before and after the target minimum movement and, if a deviation between the target minimum movement and the actual minimum movement is less than a predefined limit value, the particular following industrial truck can be identified as the following industrial truck intended to be remotely controlled.

Another embodiment of the method provides that the communication unit of the leading industrial truck and the communication unit of the following industrial truck can transmit control commands for remotely controlling the following industrial truck via the wireless data connection with a delay time that is less than an internal delay time with which the internal control commands converted from the control commands are communicated in the following industrial truck on an internal data connection, such as an internal data bus. The delay time of the data transmitted on the wireless data connection can be less than or equal to 100 ms, less than or equal to 50 ms, less than or equal to 20 ms, less than or equal to 10 ms, or less than or equal to 5 ms.

In the method, the communication unit of the leading industrial truck and/or following industrial truck can transmit an emergency signal to a vehicle controller if the delay time of the data transmitted on the wireless data connection exceeds a predefined limit value or if the wireless data connection is interrupted, and the vehicle controller can put the leading industrial truck and/or following industrial truck into a safe operating state in response to the emergency signal.

According to another embodiment, the leading industrial truck can be operated in autonomous driving operation according to automation level 4 or higher and the following industrial truck can be operated in autonomous driving operation according to automation level 3 or lower, such as in autonomous driving operation according to automation level 2 or lower, in autonomous driving operation according to automation level 1 or lower and/or the following industrial truck does not span an environment monitoring region in which personal protection is guaranteed, such as does not span an environment monitoring region.

Such object can also be solved by a method for transporting an industrial truck in a logistics system. The logistics system comprises at least one leading industrial truck and at least one following industrial truck. The at least one leading industrial truck is equipped and configured for autonomous driving operation. The at least one following industrial truck is not equipped and configured for autonomous driving operation. The leading industrial truck comprises an environment monitoring system, which spans an environment monitoring region. The leading industrial truck and the following industrial truck each comprise a communication unit, which are configured to operate a wireless data connection between the leading industrial truck and the following industrial truck. The leading industrial truck and the following industrial truck are further configured in that the leading industrial truck controls the following industrial truck remotely via the wireless data connection. The leading industrial truck comprises an autonomous control unit, which is configured to control the following industrial truck along a target path. Said target path can be defined or calculated by the leading industrial truck itself. Alternatively, the leading industrial truck receives the data relating to the trajectory of the target path from a higher-level central instance of the logistics system. In order to control the following industrial truck, the leading industrial truck determines a position and orientation of the following industrial truck in relation to the leading industrial truck. The autonomous control unit of the leading industrial truck can be further configured to remotely control the following industrial truck in that the following industrial truck is always located within the environment monitoring region of the leading industrial truck when traveling along the target path.

Moreover, the autonomous control unit of the leading industrial truck can be further configured to control the leading industrial truck from a starting point to a destination point and, during this journey, can control the at least one following industrial truck in that it travels within the environment monitoring region of the leading industrial truck in formation with the leading industrial truck.

The logistics system in which the method for transporting the industrial truck is carried out can further comprise a request system, which can comprise a request unit and a request coordination unit. The request unit can be configured to generate a dispatch request relating to a particular following industrial truck, wherein the dispatch request can comprise information relating to a delivery zone or delivery point, wherein the particular following industrial truck can be transported to the delivery zone or delivery point.

The method for transporting an industrial truck comprises: generating, at the request unit, a dispatch request relating to the transportation of the particular following industrial truck into the delivery zone or to a delivery point, and transmitting the dispatch request to the request coordination unit, coupling the leading industrial truck to the particular following industrial truck by establishing a wireless data connection between the communication unit of the leading industrial truck and the communication unit of the particular following industrial truck, transmitting, by the request coordination unit, a location within an approach environment of the delivery zone or delivery point as the destination point to the autonomous control unit of the leading industrial truck, autonomously driving the leading industrial truck to the destination point by the autonomous control unit of the leading industrial truck, wherein, during this journey, the autonomous control unit remotely controls the particular following industrial truck in that it travels within the environment monitoring region of the leading industrial truck, parking the particular following industrial truck in or at the delivery point.

By a method of this kind, an industrial truck that is not equipped and configured for autonomous operation can be taken to a desired destination within a logistics facility.

According to an embodiment, prior to coupling the particular leading industrial truck to the following industrial truck, a location within an approach environment of the pick-up zone or pick-up point as the destination point for a pick-up journey can be transmitted to the leading industrial truck and the leading industrial truck travels to the destination point in an autonomous journey.

The request coordination unit can be configured to receive the dispatch request from the request unit and to establish whether the leading industrial truck is available. If it is available, a location within an approach environment of the pick-up zone or pick-up point as the destination point for the pick-up journey can be transmitted to the autonomous control unit of the leading industrial truck.

In this connection, the dispatch request can contain information as to whether the following industrial truck to be picked up is a loaded or an unloaded industrial truck. If the following industrial truck is a loaded industrial truck, the leading industrial truck can directly take an empty industrial truck along on the pick-up journey. In order to guarantee this functionality, the dispatch request can be adapted accordingly for the pick-up journey, for example by the higher-level central instance. For example, the pick-up journey can be extended in that a location in an approach environment of a pick-up region in which empty industrial trucks can be found can be added as an additional destination point of this pick-up journey.

According to another embodiment, a current location of the particular following industrial truck can be defined as the pick-up point or a current stopover zone of the following industrial truck can be defined as the pick-up zone.

If the particular following industrial truck has its own position detection system, said system can independently determine the pick-up point or pick-up zone and integrate same into the dispatch request.

By such method, a large number of industrial trucks that are not equipped and configured for autonomous driving operation can still be moved autonomously in a logistics system between a pick-up zone and a delivery zone. This constitutes a significant commercial savings, since, in this way, not all industrial trucks operated in the logistics system have to be equipped and configured for autonomous driving operation.

Incidentally, the advantages mentioned in relation to the logistics system itself also apply to a method of this kind for transporting industrial trucks in a logistics system, and they will therefore not be repeated.

Moreover, such object can be solved by a computer program product which causes a logistics system according to one or more of the above-mentioned embodiments to perform the method according to one or more of the above-mentioned embodiments.

The same or similar advantages apply to the computer program product as were previously mentioned with respect to the logistics system itself, and they will therefore not be repeated.

BRIEF DESCRIPTION OF THE DRAWINGS

Further features will become evident from the description of embodiments, together with the claims and the appended drawings. Embodiments can fulfill individual features or a combination of several features.

The embodiments described below, without restricting the general idea of the invention, based on exemplary embodiments in reference to the drawings, whereby we expressly refer to the drawings with regard to the disclosure of all details that are not explained in greater detail in the text. In the drawings.

In the drawings, the same or similar elements and/or parts are, in each case, provided with the same reference numerals in that they are not introduced again in each case.

DETAILED DESCRIPTION

Figure 1:
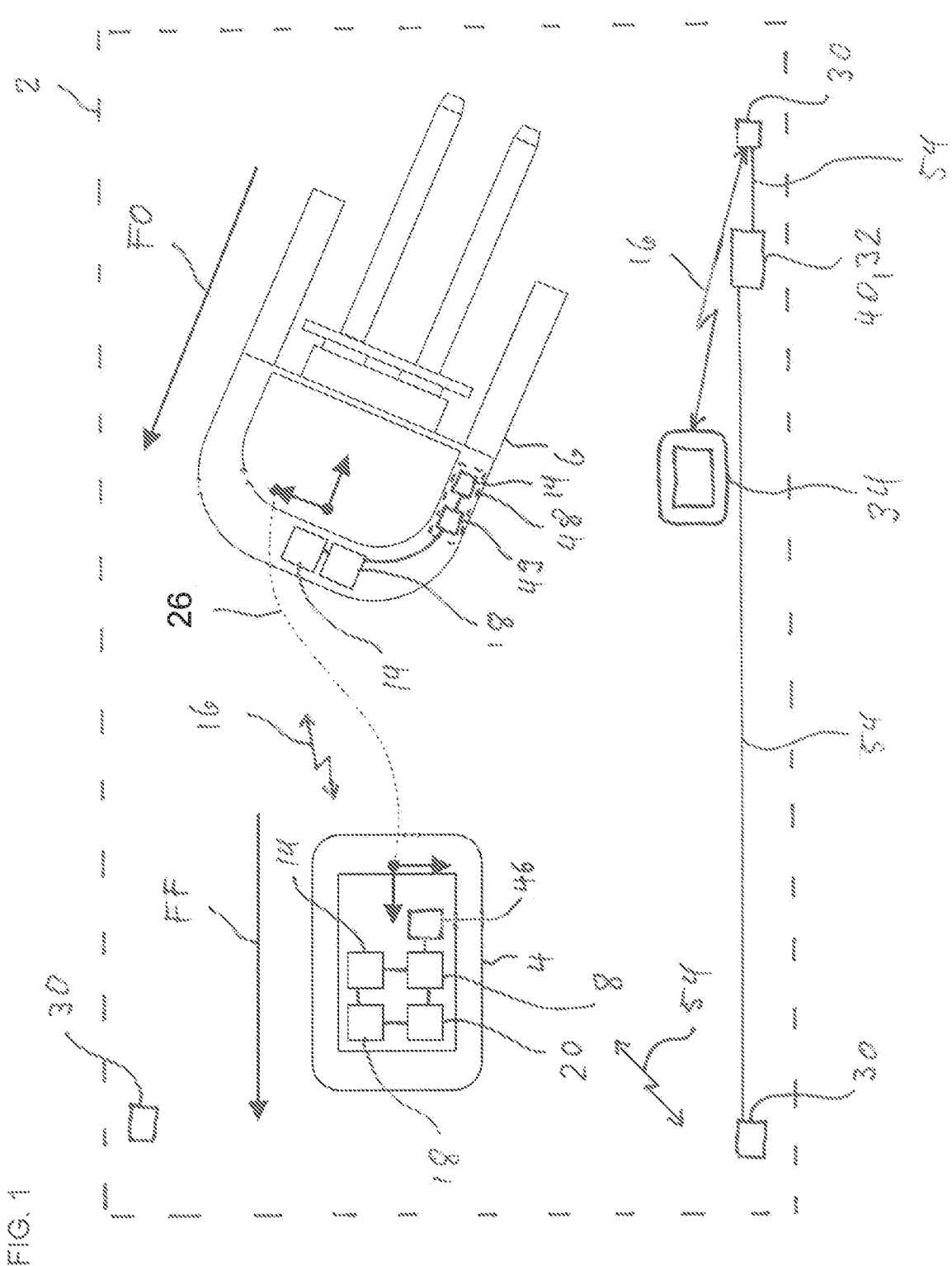
FIG. 1 illustrates a schematically simplified representation of a logistics system, comprising a leading industrial truck and a following industrial truck.

FIG. 1 shows a logistics system 2, which comprises a leading industrial truck 4 and a following industrial truck 6. Merely by way of example, a single leading industrial truck and a single following industrial truck 6 are shown. The following explanations apply equally to a logistics system 2 in which multiple leading industrial trucks and multiple following industrial trucks 6 are present. The leading industrial truck 4 is equipped and configured for autonomous driving operation. This means that the leading industrial truck 4 is equipped and configured for operation with an automation level of 4 or higher, wherein the generally accepted definition according to SAE standard J3016 is applicable. The following industrial truck 6 is not equipped and configured for autonomous driving operation and accordingly has an automation level relevant to the capability for autonomous driving of 3 or lower, wherein the above-mentioned standard is applicable again. The following industrial truck 6 therefore has, for example, an automation level of 2 or 1 or is not equipped and configured for autonomous driving operation. However, the following industrial truck 6 can be remotely controlled, i.e., for example, via a corresponding interface at the vehicle controller, via which wheel speeds and/or a steering angle, for example, can be set. This will be explained in more detail below.

Figure 2:
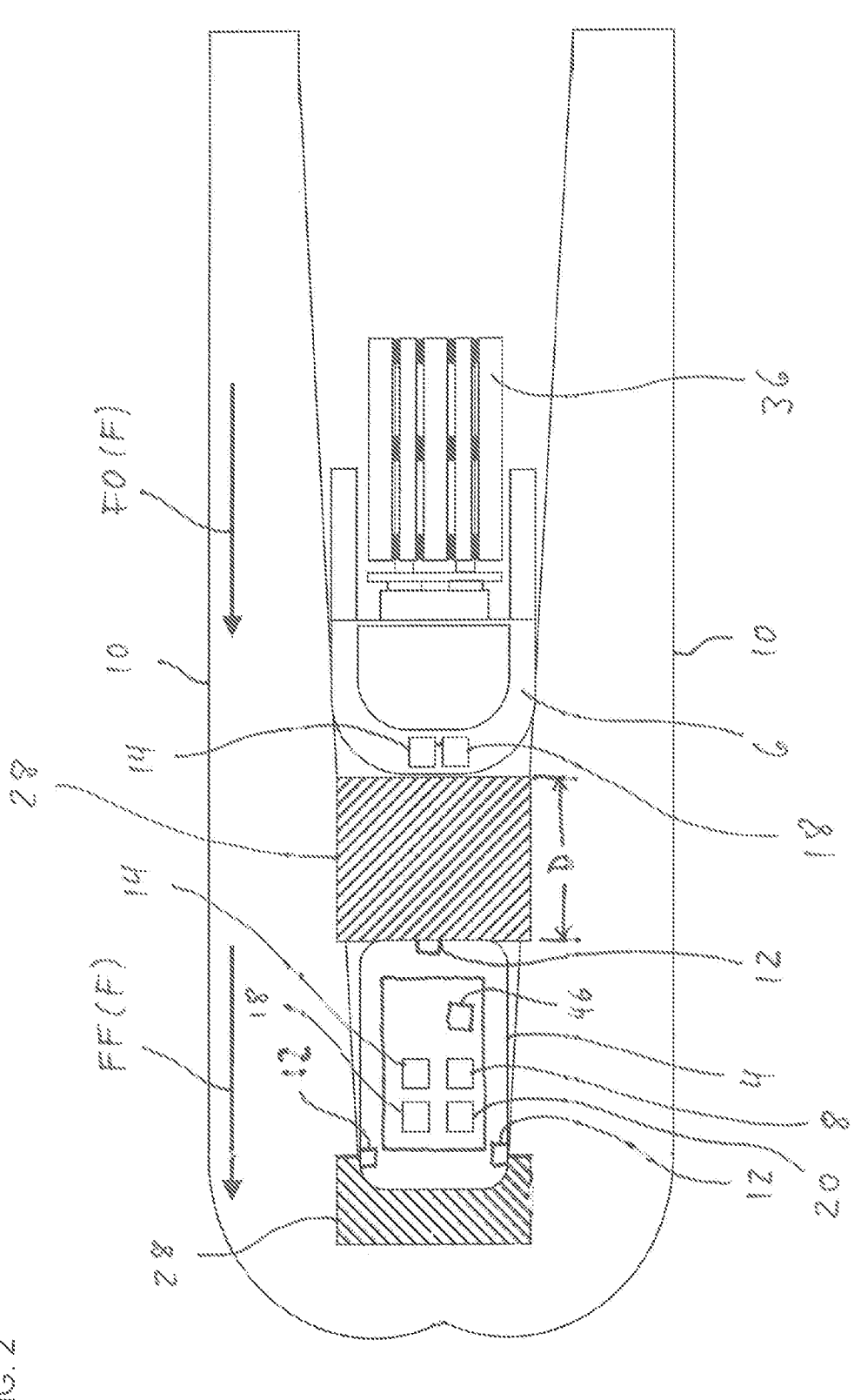
FIG. 2 illustrates a schematically simplified representation of a leading industrial truck and a following industrial truck traveling in a convoy.

The leading industrial truck 4 comprises an environment monitoring system 8, which spans an environment monitoring region 10 (see FIG. 2). For this purpose, the environment monitoring system 8 comprises a comprehensive range of sensors. Some sensors 12 on the leading industrial truck 4 are shown schematically and by way of example, said sensors being one or more of cameras, laser scanners, lidar scanners, radar sensors, ultrasound sensors, or the like, for example. The environment monitoring region 10 is, for example, a warning field, a protection field, a person protection region, or a machine protection region.

The leading industrial truck 4 and the following industrial truck 6 each comprise a communication unit 14, such as a transceiver, wherein said communication unit 14 is configured to establish and operate a wireless data connection 16 between the leading industrial truck 4 and the following industrial truck 6. The wireless data connection 16 can be a radio data connection that is operated according to one of the common and generally known radio data transmission standards, for example on the basis of WLAN, Bluetooth, ultra-wideband, or the like.

It may also be provided that, in addition or as an alternative to one of these radio data transmission standards, the wireless data connection 16 between the communication units 14 of the industrial trucks 4, 6 takes place on the basis of light signals within the visible or invisible range. For this purpose, the light signals available at the industrial trucks 4, 6, for example driving lights, brake lights, turning indicator lights, warning lights, or the like, are used, for example. This applies to transmission in the visible range. If the data transmission takes place using light signals in the invisible range, special emitters and receivers can be mounted on the industrial trucks 4, 6. A data sequence is coded, for example, by correspondingly switching one or more of these lights or lamps on and off. The data are received by detection of the light signals, for example with the aid of a camera present on the respectively receiving industrial truck 4, 6 or by one or more special receivers. The modulation frequencies of the light signals used for the data transmission can be selected to be so large that the impression of the light signals visible to the human eye remains unchanged Amplitude modulation of the light signals in the kilohertz range is conceivable, for example.

The leading industrial truck 4 and the following industrial truck 6 are further configured in that the leading industrial truck 4 controls the following industrial truck 6 remotely via the wireless data connection 16. For this purpose, the relevant communication unit 14 has a data connection to a relevant vehicle controller 18 of the leading industrial truck 4 or following industrial truck 6. The leading industrial truck 4 also comprises an autonomous control unit 20, such as a controller, processor, CPU, computer, circuit etc., which is configured to control the leading industrial truck 4 from a starting point 22 to a destination point 24. The leading industrial truck 4 covers the travel route between the starting point 22 and the destination point 24 in an autonomous manner (cf. FIG. 3).

Figure 3:
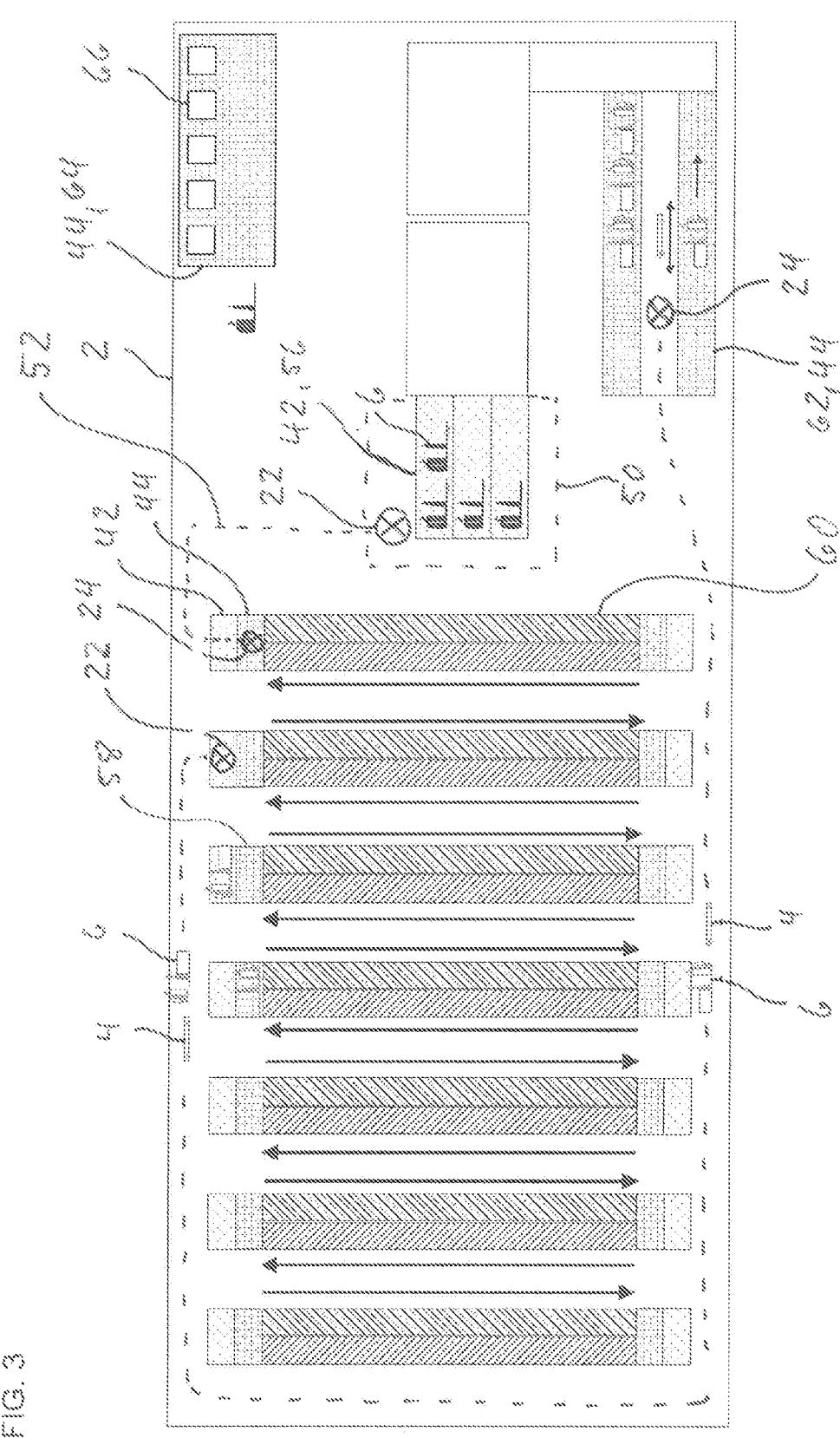
FIG. 3 illustrates a schematically simplified view of a logistics system.

FIG. 3 shows a schematically simplified plan view of a logistics site in which a logistics system 2 is installed. The leading industrial truck 4 and the following industrial truck 6 (remotely controlled via the wireless data connection 16) travel along a travel route 52 from a starting point 22 to a destination point 24. The logistics system 2 is installed, for example, in a warehouse or the like as the logistics facility. In a logistics system of this kind, a large number of starting points 22 and destination points 24 are conceivable. This will be explained in more detail below.

The autonomous control unit 20 of the leading industrial truck 4 shown in FIG. 1 is further configured, during the journey along the travel route 52, to calculate a target path 26 for the following industrial truck 6 and to remotely control the following industrial truck 6 during the journey along the target path 26 in that said truck is always located within the environment monitoring region 10 of the leading industrial truck 4. For example, it is provided that, during this journey, the following industrial truck 6 is remotely controlled in that it travels within the environment monitoring region 10 of the leading industrial truck 4 in formation with the leading industrial truck 4.

Formation travel of this kind is shown by way of example in FIG. 2. By way of example, formation travel corresponding to travel with one following on behind the other is shown. The following industrial truck 6 follows the leading industrial truck 4 in the trail thereof. However, formation travel is not limited to travel with one following on behind the other. According to other exemplary embodiments, it is provided that the leading industrial truck 4 and the following industrial truck 6 travel in another arrangement relative to one another. The following industrial truck 6 is located within the environment monitoring region 10 spanned by the sensors 12 of the environment monitoring system 8 of the leading industrial truck 4. Within the context of the present description, an arrangement of the following industrial truck 6 within the environment monitoring region 10 spanned by the leading industrial truck 4 can mean that the following industrial truck 6 is enclosed on at least three sides by the environment monitoring region 10 of the leading industrial truck 4. In the exemplary embodiment shown, the environment monitoring region 10 extends in front of the leading industrial truck 4 in the direction of travel F and thus in front of the following industrial truck 6 as well. The environment monitoring region 10 extends to the side at least to an end of the following industrial truck 6 that is at the rear in the direction of travel F or, as shown in FIG. 2, even beyond that. For safe convoy travel of the leading industrial truck 4 and following industrial truck 6, it is not necessary for the environment monitoring region 10 to also extend into the region directly behind the following industrial truck 6 in the direction of travel F.

However, this does not exclude the following industrial truck 6 from spanning its own, additional environment monitoring region (not shown) that also extends, for example, behind the following industrial truck 6 in the direction of travel F, using its own sensors and correspondingly associated control units (also not shown). An additional environment monitoring region of this kind may, for example, be a person monitoring region spanned by the following industrial truck 6. If a breach of this additional environment monitoring region is detected by the following industrial truck 6, said truck can react thereto in accordance with its own control logic, for example it may slow down or stop the journey. The following industrial truck 6 can transmit a signal to the leading industrial truck 4 in such an event, which leading industrial truck then reacts with an action provided for such a case and, for example, stops the journey of the entire convoy. In this connection, the communication between the following industrial truck 6 and the leading industrial truck 4 takes place, such as, via the wireless data connection 16 present between the industrial trucks 4, 6.

The autonomous control unit 20 controls a direction of travel FF of the leading industrial truck 4 in such a way that said truck follows the computed travel route 52. This control is indicated by arrows in FIG. 1. For successful convoy travel of the leading industrial truck 4 and following industrial truck 6, the following industrial truck 6 must follow the leading industrial truck 4, i.e., it must always orient its direction of travel FO to a target path 26 provided for the following industrial truck 6.

In the case of straight-ahead travel, the directions of travel FF of the leading industrial truck 4 and the direction of travel FO of the following industrial truck 6 match, as shown in FIG. 2. The control of the following industrial truck 6 performed, for example, by a vehicle controller 18 is also indicated with arrows in FIG. 1. For control of the following industrial truck 6 of this kind by the leading industrial truck 4, the leading industrial truck 4, or more precisely its autonomous control unit 20, must be able to determine the position of the following industrial truck 6 or be provided with the corresponding data. According to one exemplary embodiment, it is provided that the autonomous control unit 20 evaluates sensor data of the environment monitoring system 8 for this purpose. Since the following industrial truck 6 is located within the environment monitoring region 10 at all points in time during the convoy journey, position determination of this kind is readily possible.

Alternatively or additionally, it is provided that the autonomous control unit 20 evaluates internal parameters from the vehicle controller 18 of the following industrial truck 6 for the purpose of determining the position of the following industrial truck 6. These internal parameters are, for example, measured values of an odometer, a current speed, a steering angle, one or more wheel speeds, or the motor speed of the traction motor of the following industrial truck 6. By evaluating these internal parameters, which are communicated, for example, from the vehicle controller 18 of the following industrial truck 6 via the wireless data connection 16 to the leading industrial truck 4, it is readily possible, for example, to maintain a constant distance D between the leading industrial truck 4 and the following industrial truck 6 during convoy travel. If the following industrial truck 6 has its own position detection system, position data of the following industrial truck 6 can be transmitted to the leading industrial truck 4. With the knowledge of its own position data, the leading industrial truck 4 is able to determine the position of the leading industrial truck 4 relative to the following industrial truck 6. In this way, too, the following industrial truck 6 can be controlled.

Additionally, one of the sensors 12 of the environment monitoring system 8 of the leading industrial truck 4 can span a safety region 28 between the industrial trucks 4, 6. This safety region 28, which may also extend in front of the leading industrial truck 4 in the direction of travel F, is a personal protection region, for example. These personal protection regions are important, such as at the start of convoy travel. For example, it must be ensured that the safety region 28 between the leading industrial truck 4 and the following industrial truck 6 is free from people prior to the start of convoy travel.

In an operating state in which the direction of travel FF of the leading industrial truck 4 and the direction of travel FO of the following industrial truck 6 coincide, as shown by way of example in FIG. 2, the convoy travel is carried out with a reduced number of sensors, since in the case of straight-ahead travel of this kind, in which the directions of travel FF, FO correspond to a common direction of travel F, only the distance D between the industrial trucks 4, 6 must be kept constant.

In order to determine the position of the following industrial truck 6, data of the position detection system of the leading industrial truck 4 and of the following industrial truck 6 are evaluated. The position detection system may be implemented as part of the vehicle controller 18. The positions of the industrial trucks 4, 6 are detected, for example, by a positioning system installed in a logistics facility. The industrial trucks 4, 6 may determine their position within the logistics facility, for example, by evaluating radio signals from access points 30 of an installed positioning system. Proceeding from a distance between from the industrial truck 4, 6 to at least three access points 30 determined, for example, based on a signal strength, the position of the industrial truck 4, 6 can be determined by triangulation. The radio data connections to the access points 30 used for the position determination can in turn be operated on the basis of generally known standards, for example on the basis of RFID, ultra-wideband, Bluetooth, WLAN, or the like. It is also possible for the position determination on the part of the industrial trucks 4, 6 to take place based on the evaluation of the data of a GPS system, which may be used in the case of logistics systems 2 installed in the open air. The access points 30 are coupled to a central computer 32 via data connections 54. The data connections 54 may be wired or wireless data connections.

In order to allow for successful convoy travel between the leading industrial truck 4 and the following industrial truck 6, the autonomous control unit 20 evaluates the positions of the leading industrial truck 4 and following industrial truck 6 determined in a common coordinate system and, from these data, determines an arrangement or positioning of the industrial trucks 4, 6 relative to one another.

Based on the knowledge of its own position, i.e., the position of the leading industrial truck 4, the autonomous control unit 20 is able to calculate the travel route 52 to be traveled by the leading industrial truck 4 for its journey from the starting point 22 to the destination point 24. Moreover, the spatial and local conditions of the logistics facility, for example the position and extent of obstacles such as racks, special restricted areas, structural obstacles, and the like, can be taken into account for the calculation of the travel route 52. For this purpose, the autonomous control unit 20 has corresponding data that may be present internally in the leading industrial truck 4, for example in the vehicle controller 18. Additionally or alternatively, this information may be queried by the autonomous control unit 20 via a data connection 54, for example via a wireless data connection 54 to the access points 30, from a central computer 32 of the logistics facility.

However, the autonomous control unit 20 is not only configured to calculate a travel route 52 traveled by the leading industrial truck 4, but also the target path 26 provided for the following industrial truck 6. In this connection, the autonomous control unit 20 can take into account parameters of the following industrial truck 6, for example the outer dimensions thereof, a dimension of the load received by the following industrial truck 6, a maneuverability of the following industrial truck 6, and the like.

By way of example, the leading industrial truck 4 is an industrial truck that is specially provided for this purpose and that is not intended for transporting loads. However, the described functionality can also be implemented in the same way in any other industrial trucks. By way of example, the following industrial truck 6 is a reach truck. However, the described functionality also applies in the same way to other accordingly configured industrial trucks, for example picking trucks or other types of stacker truck.

The logistics system 2 further comprises a request unit 34, in the form of a controller, processor, CPU, computer, circuit etc. As shown schematically in FIG. 1, the request unit 34 may be configured as a separate unit, for example in the form of a tablet, smartphone, or the like. However, it is also provided that the request unit 34 is implemented as a functional unit, for example in the vehicle controller 18 of the leading industrial truck 4 or following industrial truck 6. The request unit 34 may further be implemented as a functional unit of the central computer 32 of the logistics system 2. The request unit 34 is configured to receive a dispatch message relating to a particular following industrial truck 6. This takes place, for example, via a corresponding user interface of the tablet or an operating unit connected to the vehicle controller 18. The dispatch request comprises information relating to a pick-up point and/or pick-up zone 42 and to a delivery point and/or delivery zone 44 of the following industrial truck 6. This information may be provided, for example, by user inputs of the request unit 34 (see FIG. 3).

The following application example illustrates the functionality of the request unit 34 based on FIG. 3. By way of example, the following industrial truck 6 is a picking truck. By way of example, the following industrial truck 6 is located in a pick-up region 56 in which multiple following industrial trucks 6 are present and are parking, only one of which trucks is provided with a reference sign for the sake of clarity. The following industrial trucks 6 are loaded with empty pallets, by way of example. In order to be able to load a picking truck of this kind with goods, said truck is taken from the pick-up region 56 into a provision region 58. With regard to the journey from the pick-up region 56 into the provision region 58, the pick-up region 56 is a pick-up zone 42 and the provision region 58 is a delivery zone 44 for the relevant following industrial truck 6.

In FIG. 3, the pick-up zones 42 are shown in dotted hatching and the delivery zones 44 are shown in checkered hatching. In order to transport the picking truck as the following industrial truck 6 from the pick-up region 56 into the provision region 58, a dispatch request that specifies to a leading industrial truck 4 the starting point 22 in the proximity of the pick-up region 56 and the destination point 24 within or in the proximity of the provision region 58 is generated, for example, by a central computer 40 (cf. FIG. 1) of the logistics system 2. The leading industrial truck 4 then proceeds to the starting point 22, which, in the exemplary embodiment shown, is within an approach environment 50 surrounding the pick-up region 56 as the pick-up zone 42. The starting point 22 may also be located within the pick-up zone 42. A positioning of the starting point 22 in the approach environment 50 surrounding the pick-up zone 42 means that the leading industrial truck 4 does not interfere with operations within the pick-up region 56.

The leading industrial truck 4 establishes a wireless data connection 16 to one of the following industrial trucks 6 and identifies the following industrial truck 6. The identification process is described in more detail below. After successful coupling of the leading industrial truck 4 to the following industrial truck 6, the following industrial truck 6 is moved out of its parking space in the pick-up region 56 by the leading industrial truck 4. During this process, the leading industrial truck 4 may be at rest, i.e., at a standstill, while it remotely controls the travel of the following industrial truck 6. During this process, too, the following industrial truck 6 is always located in the environment monitoring region 10 of the leading industrial truck 4. Subsequently, the leading industrial truck 4 and the following industrial truck 6 travel along the travel route 52, for example in a convoy journey. The convoy covers this travel route 52 in an entirely autonomous journey.

After the leading industrial truck 4 arrives at the destination point 24, the following industrial truck 6 is parked in the provision region 58 and the leading industrial truck 4 decouples from the following industrial truck 6. The leading industrial truck 4 is now ready for other tasks.

A logistics employee picks up the provided industrial truck in the pick-up region 56 and, for example, loads the pallet 36 (cf. FIG. 1) of a picking truck or reach truck of this kind with the intended goods, which are removed, for example, from high-bay racking 60 or the like. Once the order-picking process is complete, i.e., all desired goods are arranged on the pallet 36 of the picking truck, the logistics employee sends a dispatch request for its picking truck, which at this moment becomes a following industrial truck 6, using a mobile request unit 34 (FIG. 1), for example. Before the logistics employee provides the dispatch request, said person may park the industrial truck, i.e., for example, the picking truck, in one of the pick-up zones 42. Alternatively, said person simply leaves the industrial truck at the location of the last activity, i.e., in the high-bay racking 60, for example.

The request unit 34 communicates with a request coordination unit 40 via a wireless data connection 16. The following industrial truck 6 or the request unit 34 can determine its position within the logistics facility and define said position as the pick-up point of the dispatch request. Equally, the pick-up zone 42 in which the logistics employee parked the industrial truck may be specified in the dispatch request. The logistics employee then defines a delivery point for the following industrial truck 6, for example a delivery region 62 in which the picked pallet 36 is to be transferred to another logistics unit, for example an HGV or the like.

The request unit 34 is configured to establish whether a leading industrial truck 4 is available for picking up the following industrial truck 6. The request unit 34 receives information of this kind, for example, from the central computer 32 of the logistics system 2. If the leading industrial truck 4 is available, the pick-up zone 42 at which the following industrial truck 6 is currently located is defined as the starting point 22 in the autonomous control unit 20 of said leading industrial truck. The delivery zone 44 defined, for example, by the logistics employee is defined as the destination point 24 of the journey to then be made autonomously in a convoy with the following industrial truck 6. As a result, as soon as it is available, the leading industrial truck 4 proceeds to the pick-up zone 42 in which the following industrial truck 6 is located, couples thereto, and forms a convoy. It transports the following industrial truck 6 in an autonomous journey along the travel route 52 to the defined delivery zone 44, which is the destination point 24 of the autonomous journey.

In addition, it may be provided that another dispatch request in addition to the above-described dispatch request is provided at the same time, for example on the part of the logistics employee or automatically via the request unit 34. Said additional dispatch request may include, for example, that an empty industrial truck is directly taken along by the leading industrial truck 4, which picks up the loaded following industrial truck 6, to a delivery zone 44 which is located, for example, on the same end face of the racks of the high-bay racking 60 as the above-mentioned pick-up zone 42. Therefore, an additional, empty picking truck is taken along by the leading industrial truck 4, which picks up the first picking truck, and therefore the logistics employee can continue with their order-picking activity using said additional picking truck directly at the pick-up point. Of course, it is also provided that the empty picking truck is transported to a point that deviates from the pick-up point of the loaded first picking truck.

After the industrial trucks, such as the following industrial trucks 6, have completed various tasks within the logistics system 2, it may be necessary for said trucks to be charged. For this purpose, the logistics system comprises a charging region 64. Various charging stations 66 can be found in said charging region 64. It is provided, for example, that the following industrial truck 6 transmits its state of charge to the leading industrial truck 4 while said trucks are coupled to one another via the wireless data connection 16. In this way, the leading industrial truck 4 can decide whether it is necessary to take the following industrial truck 6 to the charging region 64. This task can, of course, also be taken on by the central computer 32 of the logistics system 2. Said central computer then, for example, specifies to the corresponding leading industrial truck 4 a destination point 24 that is located within the charging region 64 or within an approach environment 50 of the charging region 64.

Figures 4A, 4B:
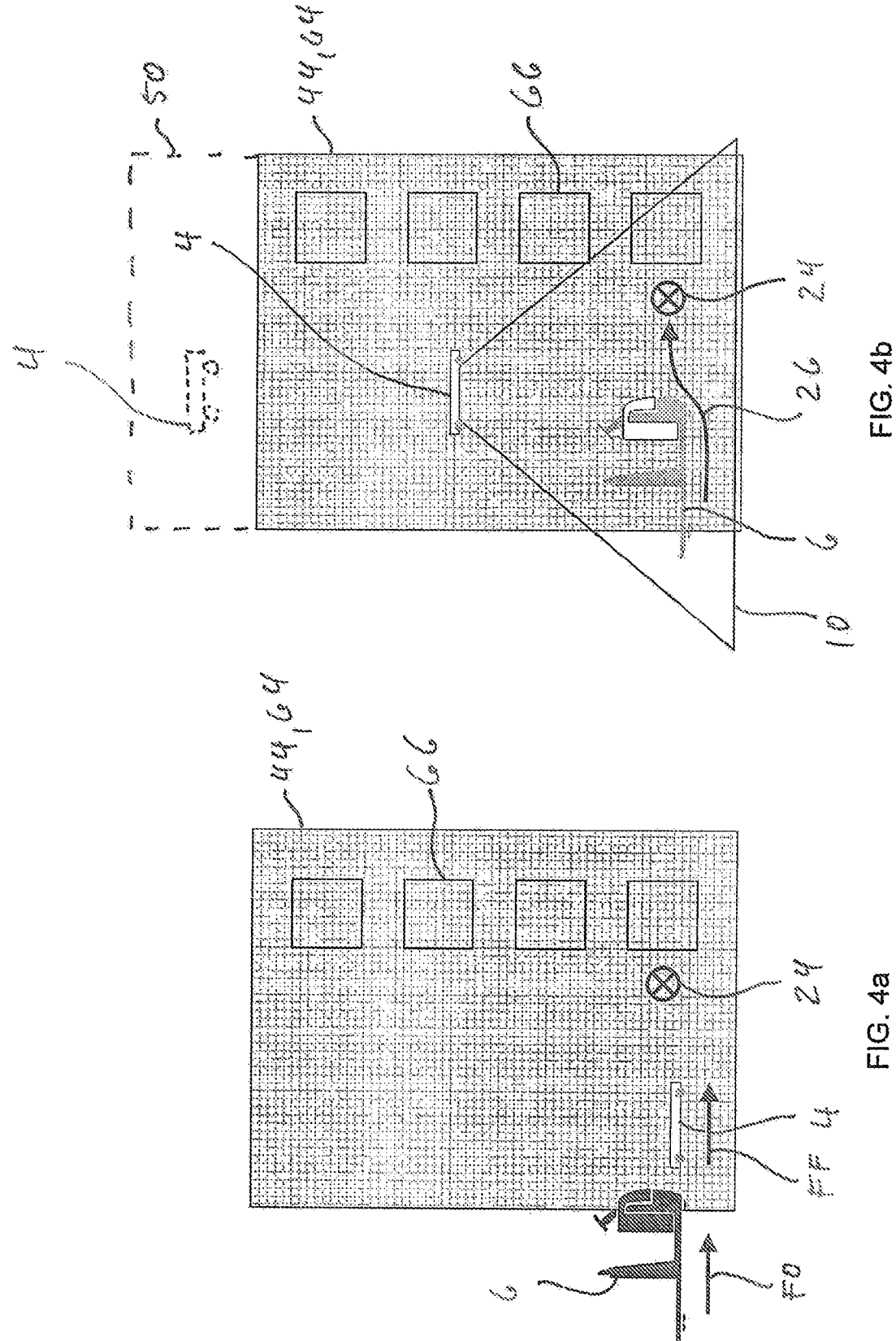
FIGS. 4a and 4b illustrate schematically simplified detail views that illustrate the delivery of a following industrial truck by a leading industrial truck in a delivery zone.

This situation is shown schematically in FIG. 4a. The leading industrial truck 4 takes the picking truck as the following industrial truck 6 into the charging region 64 as the delivery zone 44. Subsequently, the leading industrial truck 4 stops the convoy and moves to the position shown in FIG. 4b while the following industrial truck 6 remains stationary. The stationary leading industrial truck 4 is then able to control the following industrial truck 6 along the target path 26 to the destination point 24, in that the picking truck can then be coupled to one of the charging stations 66. In order not to interfere with operations within the charging zone 64, it may also be provided that the leading industrial truck 4 is located within the approach environment 50 during this process, as shown by the dashed line.

For the coupling between the leading industrial truck 4 and the following industrial truck 6, the leading industrial truck 4 must clearly identify the following industrial truck 6, if applicable from a large number of following industrial trucks 6 located in a similar region. For this purpose, the leading industrial truck 4 comprises an identification system 46 (FIG. 1), for example. After the wireless data connection 16 between the leading industrial truck 4 and the following industrial truck 6 has been established, the identification system 46 is configured, for example, to remotely control the following industrial truck 6 in that it performs a predefined minimum movement, a so-called target minimum movement. For example, the following industrial truck 6 travels a minimum distance and performs a minimum steering movement. Said target minimum movement is detected by the autonomous control unit 20 of the leading industrial truck 4, more precisely by the environment monitoring system 8 of the leading industrial truck 4. Therefore, information relating to an actual minimum movement of the following industrial truck 6 and to a target minimum movement are available to the autonomous control unit 20. By a comparison of, for example, the location coordinates or the orientation between the leading industrial truck 4 and the following industrial truck 6, the autonomous control unit 20 of the leading industrial truck 4 is able to compare the target movement with the actual movement. If they match up to a predefined limit value, the leading industrial truck 4 has identified the industrial truck performing the relevant movement clearly as the following industrial truck 6 and successful coupling has taken place. As an alternative or in addition to the described method, the leading industrial truck 4 may identify the following industrial truck 6 based on characteristic features, for example its shape or a QR code present on the following industrial truck 6, or the like. Short-range radio technologies, for example the reading out of an RFID tag or the like, may also be used for identification purposes.

For successful remote control of the following industrial truck 6 by the leading industrial truck 4, according to another exemplary embodiment, it is also important that the communication units 14 of the leading industrial truck 4 and following industrial truck 6 are equipped and configured in that control commands for remotely controlling the following industrial truck 6 are transmitted via the wireless data connection 16 with a delay time that is less than an internal delay time, for example on an internal data bus of the following industrial truck 6. This ensures that the control commands of the leading industrial truck 4 always reach the following industrial truck 6 in a timely manner. For example, for this purpose, the wireless data connection 16 must have a shorter delay time than the internal bus of the following industrial truck 6, which internal bus is a CAN bus or the like, for example.

According to another exemplary embodiment, it is provided that the leading industrial truck 4 and/or following industrial truck 6 is configured to transmit an emergency signal to its own vehicle controller 18 if the delay time on the wireless data connection 16 exceeds a predefined limit value or if the wireless data connection 16 is interrupted. In response to this emergency signal, the vehicle controller 18 puts the leading industrial truck 4 and/or following industrial truck 6 into a safe operating state, i.e., stops travel thereof or activates an emergency signal light system.

A retrofit kit 48 (FIG. 1) is provided for retrofitting an industrial truck, for example an older industrial truck, for operation in the logistics system 2. Said retrofit kit 48 may be integrated in an industrial truck and is data-coupled to an internal bus system of said industrial truck. The retrofit kit 48 comprises a communication unit 14 and a control unit 49. The communication unit 14 is configured to operate a wireless data connection 16 to the leading industrial truck 4. It is also configured to receive control data for remotely controlling the industrial truck via the data connection 16.

The control unit 49 also comprises an interface to a vehicle controller 18 of the industrial truck, wherein the control unit 49 is also configured to convert the control data received from the communication unit 14 via the wireless data connection 16 into driving commands for the industrial truck. For example, the received driving commands are converted into wheel speeds and steering angles. The corresponding control data are provided at the interface to the vehicle controller 18. In this way, practically any industrial truck can be upgraded or retrofitted as the following industrial truck 6.

In the representation of FIG. 1, the retrofit kit 48 should be understood as optional, i.e., either the industrial truck is equipped with a corresponding retrofit kit 48 or the vehicle controller 18 already has the required functionality and is also coupled to a communication unit 14, which is likewise already present.

According to a method for operating the logistics system 2, said logistics system, which comprises at least one leading industrial truck 4 and at least one following industrial truck 6, carries out the following steps:

The leading industrial truck 4 is operated in autonomous driving operation and the following industrial truck 6 is operated in non-autonomous driving operation.

The leading industrial truck 4 comprises an environment monitoring system 8, which spans an environment monitoring region, wherein the leading industrial truck 4 and the following industrial truck 6 each comprise a communication unit 14, which operate the wire-less data connection. The leading industrial truck 4 controls the following industrial truck 6 remotely via said wireless data connection.

The leading industrial truck 6 comprises an autonomous control unit 20, which controls the following industrial truck 6 along a target path and, in order to control the following industrial truck 6, determines a position and orientation of the following industrial truck 6 in relation to the leading industrial truck 4.

The autonomous control unit 20 of the leading industrial truck 4 is configured to remotely control the following industrial truck 6 in that the following industrial truck 6 is always located within the environment monitoring region 10 of the leading industrial truck 4 when traveling along the target path.

According to another exemplary embodiment, a method for transporting an industrial truck in the logistics system 2 is provided. The logistics system 2 comprises at least one leading industrial truck 4 and at least one following industrial truck 6. The autonomous control unit 20 of the leading industrial truck 4 is configured to control same to a destination point 24. The starting point of its journey is initially irrelevant for this functionality. During the journey to the destination point 24, the leading industrial truck 4 controls the following industrial truck 6 within its environment monitoring region 10. By way of example, the two industrial trucks travel in formation.

A dispatch request relating to the transportation of a particular following industrial truck 6 into one of the delivery zones 44 or to a delivery point arrives at the leading industrial truck 4 via the request system. If the leading industrial truck 4 is not already located in the proximity of the relevant following industrial truck 6, and is not directly capable of a coupling procedure, it initially embarks on a pick-up journey. The destination of said pick-up journey is the current location of the following industrial truck 6. Information relating to the current location of the following industrial truck 6 is comprised in the dispatch request. Subsequently, the leading industrial truck 4 couples to the following industrial truck 6 and transports the following industrial truck 6 to the desired delivery zone 44 or desired delivery point in an autonomous journey.

While there has been shown and described what is considered to be embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCE SIGNS

2 Logistics system
4 Leading industrial truck
6 Following industrial truck
8 Environment monitoring system
10 Environment monitoring region
12 Sensors

14 Communication unit
16 Wireless data connection
18 Vehicle controller
20 Autonomous control unit
22 Starting point
24 Destination point
26 Target path
28 Safety region
30 Access point
32 Central computer
34 Request unit
36 Pallet
40 Request coordination unit
42 Pick-up zone
44 Delivery zone
46 Identification system
48 Retrofit kit
49 Control unit
50 Approach environment
52 Travel route
54 Data connections
56 Pick-up region
58 Provision region
60 High-bay racking
62 Delivery region
64 Charging region
66 Charging stations
D Distance
F Direction of travel
FF Direction of travel, leading industrial truck
FO Direction of travel, following industrial truck

What is claimed is:

1. A logistics system comprising:

a leading industrial truck; and at least one following industrial truck;

wherein the leading industrial truck is configured for autonomous driving operation and the at least one following industrial truck is not configured for autonomous driving operation, the leading industrial truck comprises an environment monitoring system having one or more sensors for spanning an environment monitoring region;

the leading industrial truck and the at least one following industrial truck each comprise a transceiver configured to operate a wireless data connection between the leading industrial truck and the at least one following industrial truck;

the leading industrial truck and the at least one following industrial truck are configured such that the leading industrial truck controls the at least one following industrial truck remotely via the wireless data connection;

the leading industrial truck comprises an autonomous controller comprising hardware, the autonomous controller being configured to control the following industrial truck along a target path to determine a position and an orientation of the following industrial truck in relation to the leading industrial truck; and the autonomous controller is further configured to remotely control the following industrial truck to always be located within the environment monitoring region of the leading industrial truck when traveling along the target path;

wherein the leading industrial truck further comprises an identification system configured to identify a particular following industrial truck as the following industrial truck intended to be remotely controlled;

wherein the autonomous controller is further configured to control the leading industrial truck from a starting point to a destination point and to remotely control the at least one following industrial truck to travel within the environment monitoring region of the leading industrial truck in formation with the leading industrial truck, further comprising a request system, comprising a request controller comprising hardware and a request coordination controller comprising hardware, wherein the request controller is configured to generate a dispatch request relating to a particular following industrial truck, wherein the dispatch request comprises information relating to one of a pick-up zone or a pick-up point and information relating to one of a delivery zone or a delivery point, the particular following industrial truck is to be transported from one of the pick-up zone or the pick-up point to one of the delivery zone or the delivery point, and the request coordination controller is configured to receive the dispatch request from the request controller and to establish whether the leading industrial truck is available and, if it is available, to transmit to the autonomous controller of the leading industrial truck a location within an approach environment of one of the pick-up zone or the pick-up point as the starting point and a location within an approach environment of one of the delivery zone or the delivery point as the destination point, wherein the request controller is a separate functional unit in the following industrial truck and the dispatch request is generated in response to a message or command that is generated by a higher-level software system of the logistics system, or the request controller is a separate operating unit in an existing system of the following industrial truck and the dispatch request is generated in response to an input generated manually by an employee at a user terminal by actuation of a quick-selection button directly at the following industrial truck.

2. The logistics system according to claim 1, wherein the autonomous controller of the leading industrial truck is configured to determine the position and the orientation of the following industrial truck in relation to the leading industrial truck by one or more of evaluating sensor data of the environment monitoring system and evaluating internal parameters from a vehicle controller of the following industrial truck, the vehicle controller comprising hardware.

3. The logistics system according to claim 1, wherein:
the autonomous controller of the leading industrial truck is configured to determine the position and the orientation of the following industrial truck in relation to the leading industrial truck by one or more of evaluating sensor data of the environment monitoring system and evaluating internal parameters from a vehicle controller of the following industrial truck, the vehicle controller comprising hardware; and
the identification system is configured, after the wireless data connection between the leading industrial truck and the particular following industrial truck has been established, to control the particular following industrial truck remotely to perform a target minimum movement and to request the relative location coordinates of the particular following industrial truck from the autonomous controller before and after the target minimum movement and to calculate an actual minimum movement of the particular following industrial truck from a comparison of the location coordinates before and after the target minimum movement and, if a deviation between the target minimum movement and the actual minimum movement is less than a predefined limit value, to identify the particular following industrial truck as the following industrial truck intended to be remotely controlled.

4. The logistics system according to claim 1, wherein the transceiver of the leading industrial truck and the transceiver of the following industrial truck are configured to transmit control commands for remotely controlling the following industrial truck via the wireless data connection with a delay time, the delay time being less than or equal to an internal delay time of the internal control commands communicated in the following industrial truck on an internal data connection and converted from the control commands.

5. The logistics system according to claim 4, wherein one or more of the transceiver of the leading industrial truck and the transceiver of the following industrial truck are configured to transmit an emergency signal to a vehicle controller of the following industrial truck if the delay time of the data transmitted on the wireless data connection exceeds a predefined limit value or if the wireless data connection is interrupted, the vehicle controller comprising hardware, and the vehicle controller is configured to put one or more of the leading industrial truck and following industrial truck into a safe operating state in response to the emergency signal.

6. The logistics system according to claim 1, wherein one or more of:
the leading industrial truck is configured for autonomous driving operation according to automation level 4 or higher and the following industrial truck is equipped and configured for autonomous driving operation according to automation level 3 or lower; and
the following industrial truck has no equipment for monitoring the environment.

7. A method for operating a logistics system, wherein the logistics system comprises a leading industrial truck and at least one following industrial truck, the method comprising:
operating the leading industrial truck in autonomous driving operation and operating the at least one following industrial truck in non-autonomous driving operation,
at the leading industrial truck, scanning an environment monitoring region,
wirelessly communicating between the leading industrial truck and the at least one following industrial truck
at the leading industrial truck, wirelessly controlling the at least one following industrial truck along a target path by determining a position and orientation of the following industrial truck in relation to the leading industrial truck,
remotely controlling the following industrial truck to always be located within the environment monitoring region of the leading industrial truck when traveling along the target path; and
using an identification to identify a particular following industrial truck as the following industrial truck to be remotely controlled,
controlling the leading industrial truck from a starting point to a destination point and to remotely control the at least one following industrial truck to travel within the environment monitoring region of the leading industrial truck in formation with the leading industrial truck, generating a dispatch request relating to a particular following industrial truck, wherein the dispatch request comprises information relating to one of a pick-up zone or a pick-up point and information relating to one of a delivery zone or a delivery point, transporting the particular following industrial truck from one of the pick-up zone or the pick-up point to one of the delivery zone or the delivery point, and receiving the dispatch request and establish whether the leading industrial truck is available and, if it is available, to transmit to the leading industrial truck a location within an approach environment of one of the pick-up zone or the pick-up point as the starting point and a location within an approach environment of one of the delivery zone or the delivery point as the destination point, wherein generating the dispatch request in response to a message or command that is generated by a higher-level software system of the logistics system, or generating the dispatch request in response to an input generated manually by an employee at a user terminal by actuation of a quick-selection button directly at the following industrial truck.

8. The method according to claim 7, wherein the leading industrial truck determines the position and orientation of the following industrial truck in relation to the leading industrial truck by one or more of evaluating received sensor data and evaluating internal parameters received from the following industrial truck.

9. The method according to claim 7, wherein:

the leading industrial truck determines the position and orientation of the following industrial truck in relation to the leading industrial truck by one or more of evaluating received sensor data and evaluating internal parameters received from the following industrial truck; and after the wireless data connection between the leading industrial truck and the particular following industrial truck has been established, controlling the particular following industrial truck remotely to perform a target minimum movement, and querying the relative location coordinates of the particular following industrial truck queried by the leading industrial truck before and after the target minimum movement and calculating an actual minimum movement of the particular following industrial truck from a comparison of the location coordinates before and after the target minimum movement and, if a deviation between the target minimum movement and the actual minimum movement is less than a predefined limit value, the particular following industrial truck is identified as the following industrial truck to be remotely controlled.

10. The method according to claim 7, further comprising transmitting, between the leading industrial truck and the following industrial truck, control commands for remotely controlling the following industrial truck via the wireless data connection with a delay time that is less than or equal to an internal delay time with which the internal control commands converted from the control commands are communicated in the following industrial truck on an internal data line.

11. The method according to claim 10, further comprising transmitting an emergency signal to the following industrial truck if the delay time of the data transmitted exceeds a predefined limit value or if the wireless connection is interrupted, and putting one or more of the leading industrial truck and following industrial truck into a safe operating state in response to the emergency signal.

12. The method according to claim 7, wherein one or more of:

the leading industrial truck is operated in autonomous driving operation according to automation level 4 or higher and the following industrial truck is operated in autonomous driving operation according to automation level 3 or lower; and the following industrial truck does not span over an environment monitoring region in which personal safety is guaranteed.

13. Non-transitory computer-readable storage medium storing instructions that cause a computer to at least perform:

operating a leading industrial truck in autonomous driving operation and operating at least one following industrial truck in non-autonomous driving operation, at the leading industrial truck, scanning an environment monitoring region, wirelessly communicating between the leading industrial truck and the at least one following industrial truck, at the leading industrial truck, wirelessly controlling the at least one following industrial truck along a target path by determining a position and orientation of the following industrial truck in relation to the leading industrial truck, remotely controlling the following industrial truck to always be located within the environment monitoring region of the leading industrial truck when traveling along the target path; and using an identification to identify a particular following industrial truck as the following industrial truck to be remotely controlled, controlling the leading industrial truck from a starting point to a destination point and to remotely control the at least one following industrial truck to travel within the environment monitoring region of the leading industrial truck in formation with the leading industrial truck, generating a dispatch request relating to a particular following industrial truck, wherein the dispatch request comprises information relating to one of a pick-up zone or a pick-up point and information relating to one of a delivery zone or a delivery point, transporting the particular following industrial truck from one of the pick-up zone or the pick-up point to one of the delivery zone or the delivery point, and receiving the dispatch request and establish whether the leading industrial truck is available and, if it is available, to transmit to the leading industrial truck a location within an approach environment of one of the pick-up zone or the pick-up point as the starting point and a location within an approach environment of one of the delivery zone or the delivery point as the destination point, wherein generating the dispatch request in response to a message or command that is generated by a higher-level software system of the logistics system, or generating the dispatch request in response to an input generated manually by an employee at a user terminal by actuation of a quick-selection button directly at the following industrial truck.

* * * * *